(12) United States Patent
Sung (10) Patent No.: US 8,807,469 B2
(45) Date of Patent: Aug. 19, 2014

(54) ICE SHAVING MACHINE

(71) Applicant: Kun-Wei Sung, Taichung (TW)

(72) Inventor: Kun-Wei Sung, Taichung (TW)

( * ) Notice: Subject to any disclaimer, the term of this patent is extended or adjusted under 35 U.S.C. 154(b) by 22 days.

(21) Appl. No.: 13/747,527

(22) Filed: Jan. 23, 2013

(65) Prior Publication Data

US 2014/0203125 A1 Jul. 24, 2014

(51) Int. Cl.
*B02C 17/02* (2006.01)
*B02C 23/00* (2006.01)

(52) U.S. Cl.
USPC .................... 241/95; 241/DIG. 17; 241/285.2

(58) Field of Classification Search
USPC ................. 241/DIG. 17, 95, 285.2
See application file for complete search history.

(56) References Cited

U.S. PATENT DOCUMENTS

| | | | |
|---|---|---|---|
| 4,569,266 A * | 2/1986 | Ando | 83/411.1 |
| 4,588,136 A * | 5/1986 | Homma | 241/95 |
| 4,718,610 A * | 1/1988 | Gallaher | 241/37.5 |
| 5,402,949 A * | 4/1995 | Berner et al. | 241/101.2 |
| 5,513,810 A * | 5/1996 | Lin | 241/95 |
| 6,012,660 A * | 1/2000 | Colman | 241/30 |
| 6,328,236 B1 * | 12/2001 | Upson | 241/95 |
| 6,908,053 B2 * | 6/2005 | Rupp | 241/86.1 |

* cited by examiner

*Primary Examiner* — Faye Francis
(74) *Attorney, Agent, or Firm* — Alan D. Kamrath; Kamrath IP Lawfirm, P.A.

(57) ABSTRACT

An ice shaving machine includes a drive unit, a limit plate secured on the drive unit, and a shaving frame detachably combined with the limit plate. The drive unit includes a rotation disk. The limit plate has a through hole and a plurality of locking grooves. The shaving frame has a receiving chamber and a shaving blade. The shaving frame has a connecting lug detachably locked onto the limit plate. The connecting lug has a passage connected to the receiving chamber and has a plurality of locking pieces that are detachably locked in the locking grooves of the limit plate. Thus, the shaving frame can be rotated to remove from the limit plate so that the shaving frame is detached and cleaned easily and conveniently.

10 Claims, 16 Drawing Sheets

ICE SHAVING MACHINE

BACKGROUND OF THE INVENTION

1. Field of the Invention

The present invention relates to a shaving machine and, more particularly, to an ice shaving machine for shaving an ice block into a lot of ice slices or chips.

2. Description of the Related Art

Figure 1:
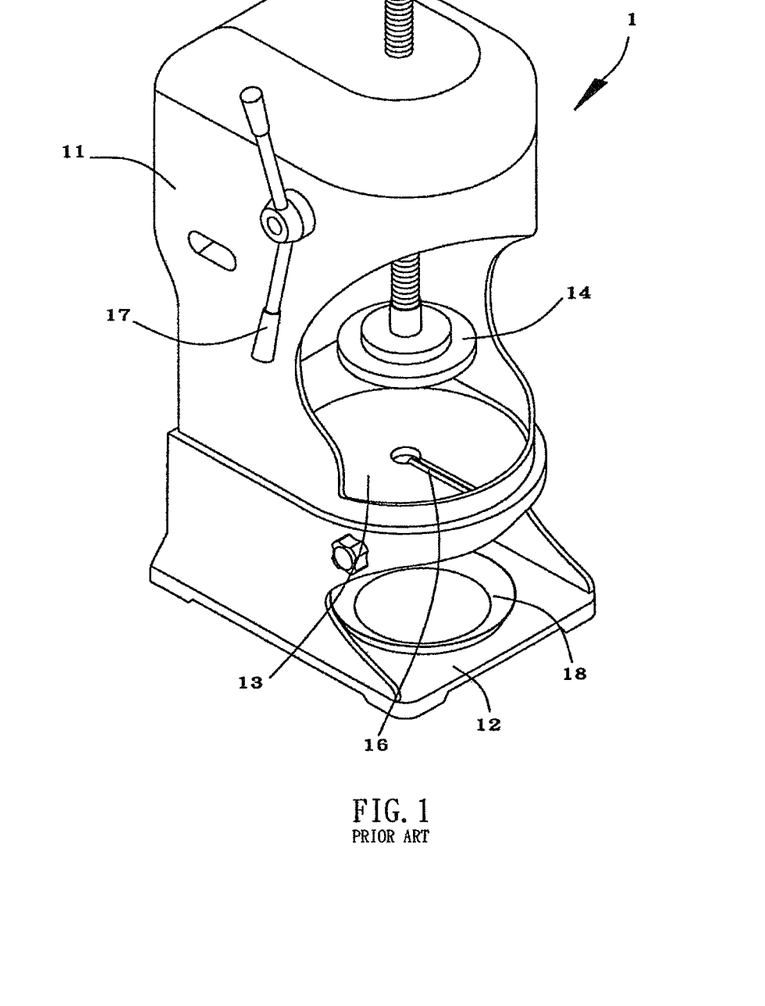
FIG. 1 is a perspective view of a conventional ice shaving machine in accordance with the prior art.
Figure 2:
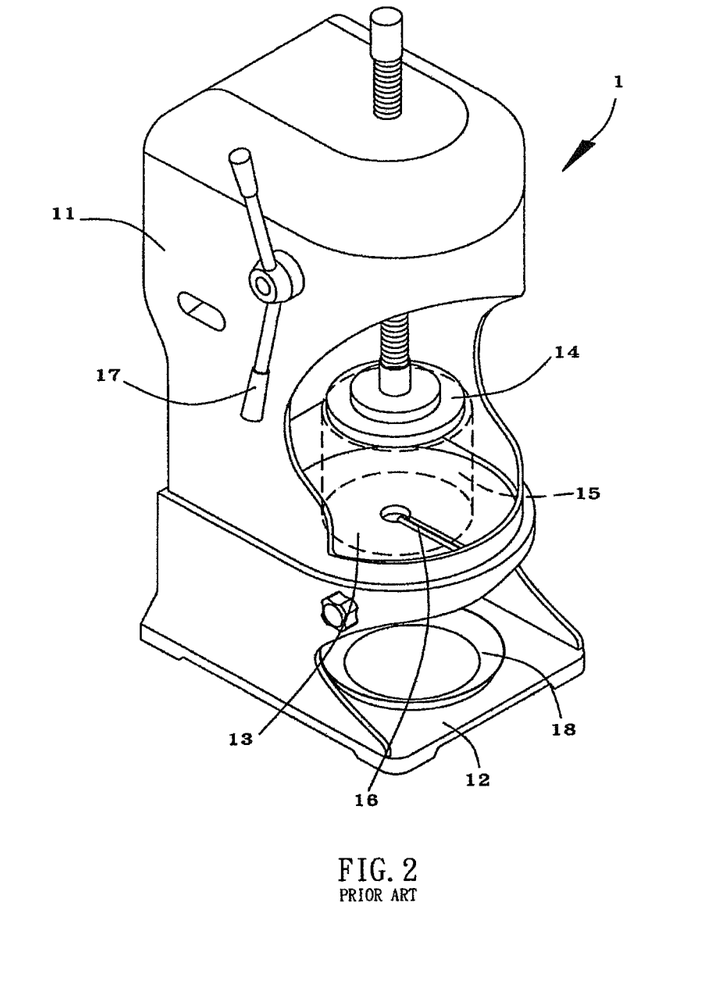
FIG. 2 is a schematic operational view of the conventional ice shaving machine as shown in FIG. 1 in use.
Figure 3:
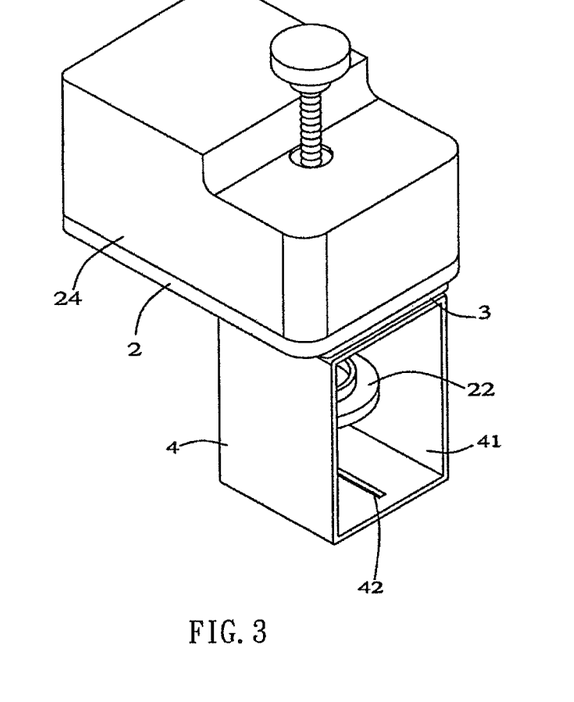
FIG. 3 is a perspective view of an ice shaving machine in accordance with the preferred embodiment of the present invention.
Figure 4:
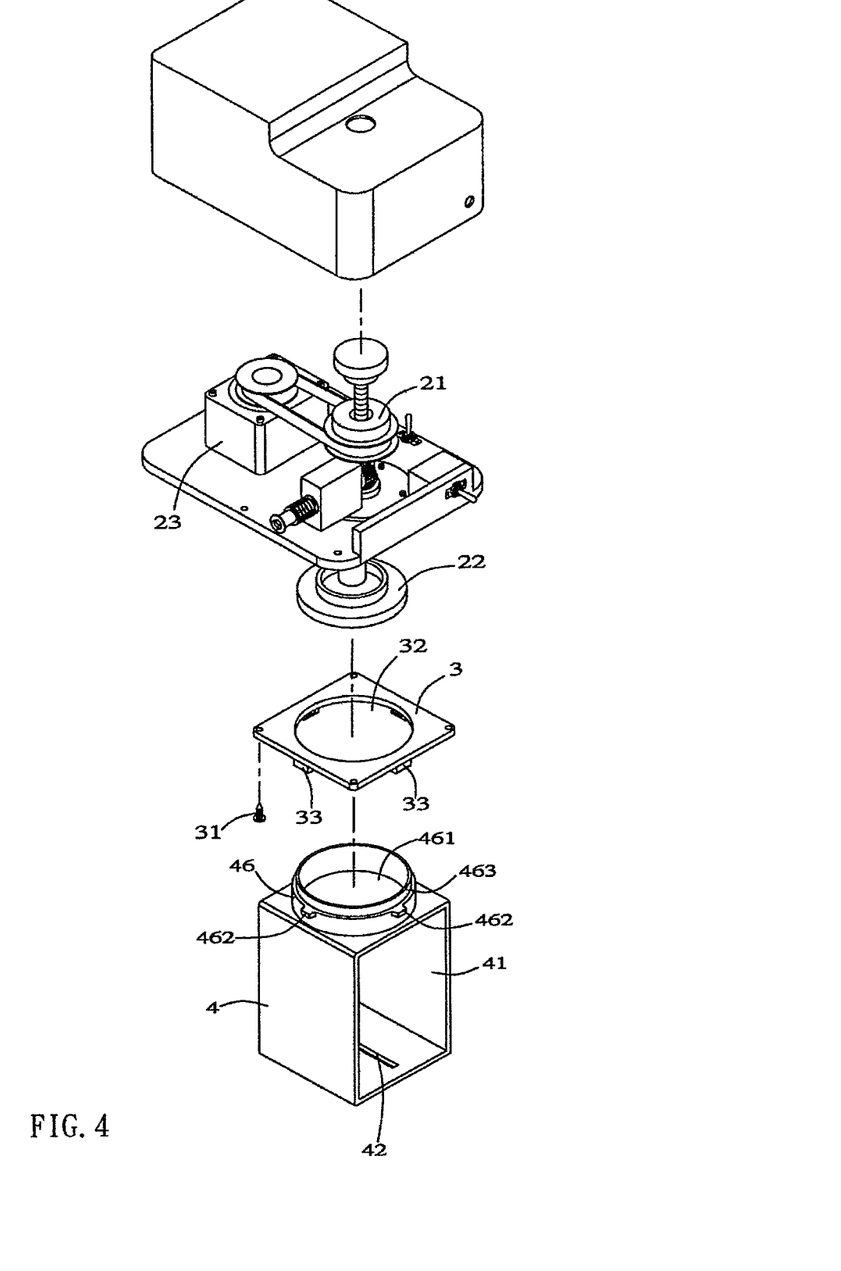
FIG. 4 is an exploded perspective view of the ice shaving machine as shown in FIG. 3.
Figure 5:
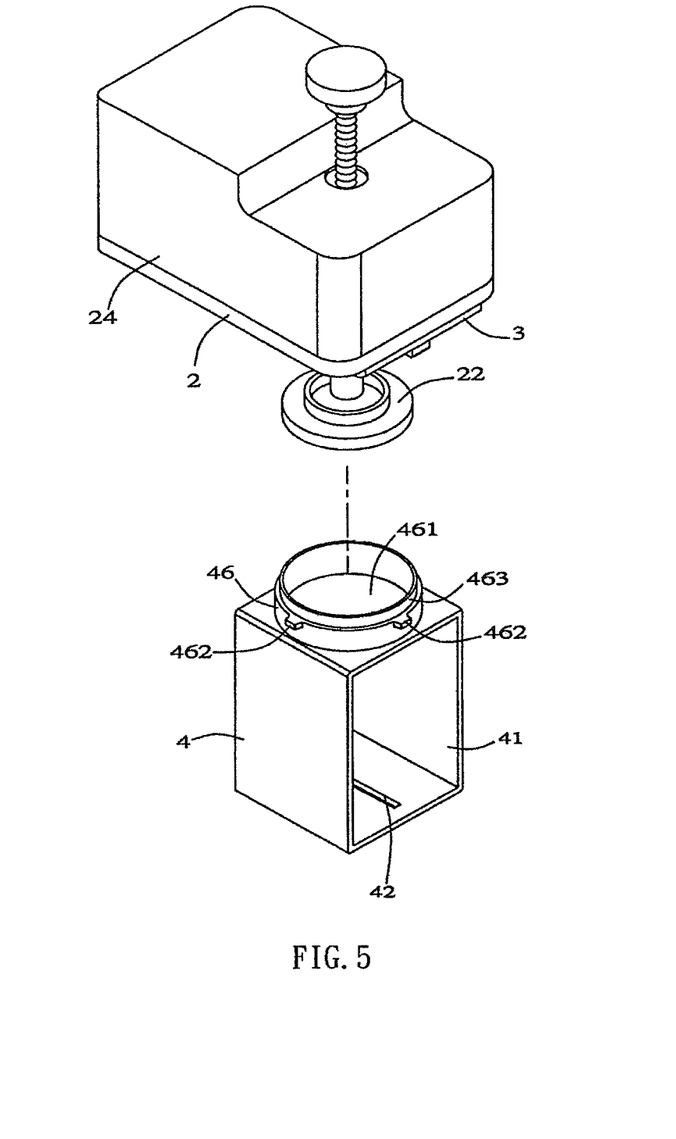
FIG. 5 is a partially exploded perspective view of the ice shaving machine as shown in FIG. 3.
Figure 6:
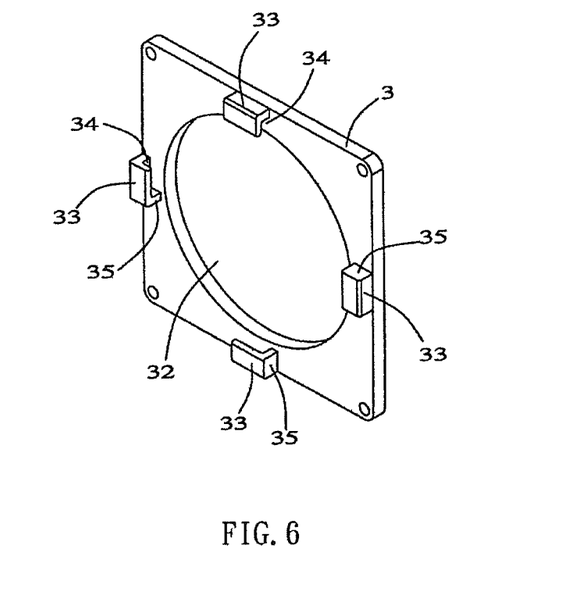
FIG. 6 is a perspective view of a limit plate of the ice shaving machine as shown in FIG. 3.

A conventional ice shaving machine 1 in accordance with the prior art shown in FIGS. 1 and 2 comprises a recessed base 12, a main body 11 mounted on the top of the base 12 and having a flat bottom 13 provided with a slotted shaving blade 16, a rotation disk 14 rotatably and movably mounted in the main body 11, a swivel handle 17 swivelably mounted on the main body 11 and connected with the rotation disk 14, and a placement dish 18 mounted in the base 12 and located under the shaving blade 16 of the main body 11. When the conventional ice shaving machine 1 is in use, an ice block 15 is initially received in the main body 11 and placed on the flat bottom 13 of the main body 11. Then, the swivel handle 17 is revolved to drive the rotation disk 14 so that the rotation disk 14 is moved downward to press the ice block 15. Then, the rotation disk 14 is driven and rotated by a driving motor (not shown) to rotate the ice block 15 so that the ice block 15 is turned by the rotation disk 14 and shaved by the shaving blade 16 to form a lot of ice chips which are extended through the shaving blade 16 and are injected toward the placement dish 18. However, the main body 11 easily produces vibration when the ice block 15 deviates the central position of the flat bottom 13 of the main body 11, thereby affecting operation of the rotation disk 14. In addition, the shaving blade 16 is subjected to an unevenly distributed force when the ice block 15 deviates the central position of the flat bottom 13 of the main body 11, thereby decreasing the lifetime of the shaving blade 16. Further, the flat bottom 13 of the main body 11 cannot be detached so that it is difficult to clean the inside of the main body 11, thereby easily causing a sanitary problem.

BRIEF SUMMARY OF THE INVENTION

In accordance with the present invention, there is provided an ice shaving machine, comprising a drive unit, a limit plate secured on a bottom of the drive unit, and a shaving frame detachably combined with the limit plate. The drive unit includes a rotation disk. The limit plate is provided with a through hole to allow passage of the rotation disk of the drive unit. The limit plate has a bottom provided with a plurality of locking grooves. The shaving frame has an interior provided with a receiving chamber to receive an ice block. The receiving chamber of the shaving frame has a side provided with an opening to allow passage of the ice block. The receiving chamber of the shaving frame has a bottom provided with a slotted shaving blade. The shaving frame has a top provided with a connecting lug detachably locked onto the limit plate. The connecting lug of the shaving frame has an interior provided with a passage to allow passage of the rotation disk of the drive unit. The passage of the connecting lug is connected to the receiving chamber of the shaving frame. The connecting lug of the shaving frame has an outer wall provided with a plurality of locking pieces that are detachably locked in the locking grooves of the limit plate.

According to the primary advantage of the present invention, the shaving frame can be rotated to remove from the limit plate so that the shaving frame is detached and cleaned easily and conveniently to facilitate a user cleaning the shaving frame and to achieve a sanitary purpose.

According to another advantage of the present invention, the shaving frame is mounted on and detached from the limit plate easily and quickly by rotation of the shaving frame relative to the limit plate so as to facilitate the user assembling and dismantling the shaving frame.

According to a further advantage of the present invention, the ice shaving machine is attached to a wall, ceiling or table so that the ice shaving machine is available for different working sites and positions.

Further benefits and advantages of the present invention will become apparent after a careful reading of the detailed description with appropriate reference to the accompanying drawings.

DETAILED DESCRIPTION OF THE INVENTION

Referring to the drawings and initially to FIGS. 3-6, an ice shaving machine in accordance with the preferred embodiment of the present invention comprises a drive unit 2, a limit plate 3 secured on a bottom of the drive unit 2, and a shaving frame 4 detachably combined with the limit plate 3.

The drive unit 2 includes a rotation disk 22, a driving member 21 and a motor 23. The driving member 21 of the drive unit 2 is driven by the motor 23. The rotation disk 22 of the drive unit 2 is driven and rotated by the driving member 21. A cover 24 is secured on the drive unit 2 to cover the drive unit 2.

The limit plate 3 is secured on the bottom of the drive unit 2 by a plurality of screw members 31. The limit plate 3 is provided with a through hole 32 to allow passage of the rotation disk 22 of the drive unit 2. The through hole 32 of the limit plate 3 has a circular shape and has a diameter greater than the maximum outer diameter of the rotation disk 22 of the drive unit 2. The limit plate 3 has a bottom provided with a plurality of locking grooves 33. Each of the locking grooves 33 of the limit plate 3 has a first end provided with an entrance 34 and a first end provided with a stop 35.

The shaving frame 4 has an interior provided with a receiving chamber 41 to receive an ice block (not shown). The receiving chamber 41 of the shaving frame 4 has a side provided with an opening to allow passage of the ice block. The receiving chamber 41 of the shaving frame 4 has a bottom provided with a slotted shaving blade 42. The shaving frame 4 has a top provided with a connecting lug 46 detachably locked onto the limit plate 3. The connecting lug 46 of the shaving frame 4 has an annular shape and has an outer diameter greater than the diameter of the through hole 32 of the limit plate 3. The connecting lug 46 of the shaving frame 4 has an interior provided with a passage 461 to allow passage of the rotation disk 22 of the drive unit 2. The passage 461 of the connecting lug 46 is connected to the receiving chamber 41 of the shaving frame 4. The passage 461 of the connecting lug 46 has a circular shape and has a diameter greater than the maximum outer diameter of the rotation disk 22 of the drive unit 2. The connecting lug 46 of the shaving frame 4 has an outer wall provided with a plurality of locking pieces 462 that are detachably locked in the locking grooves 33 of the limit plate 3. The connecting lug 46 of the shaving frame 4 has a top provided with a neck portion 463 inserted into the through hole 32 of the limit plate 3. The neck portion 463 of the connecting lug 46 is located above the locking pieces 462. The neck portion 463 of the connecting lug 46 has an annular shape and has an outer diameter slightly smaller than the diameter of the through hole 32 of the limit plate 3. The neck portion 463 of the connecting lug 46 has a height equal to or smaller than the thickness of the limit plate 3.

In assembly, when the limit plate 3 is mounted on the drive unit 2, the through hole 32 of the limit plate 3 allows passage of the rotation disk 22 of the drive unit 2. Then, the limit plate 3 is secured on the bottom of the drive unit 2 by the screw members 31. Then, the connecting lug 46 of the shaving frame 4 is mounted on the limit plate 3, with the neck portion 463 of the connecting lug 46 being inserted into the through hole 32 of the limit plate 3. At this time, the passage 461 of the connecting lug 46 allows passage of the rotation disk 22 of the drive unit 2. In such a manner, the neck portion 463 of the connecting lug 46 is limited by the through hole 32 of the limit plate 3 so that the connecting lug 46 of the shaving frame 4 is limited by the limit plate 3 and will not produce vibration. Then, the locking pieces 462 of the shaving frame 4 are aligned with the locking grooves 33 of the limit plate 3. Then, the shaving frame 4 is rotated relative to the limit plate 3 so that the locking pieces 462 of the shaving frame 4 are inserted into and locked in the locking grooves 33 of the limit plate 3 respectively to lock the shaving frame 4 onto the limit plate 3. At this time, each of the locking pieces 462 of the shaving frame 4 is extended through the entrance 34 into and stopped by the stop 35 of a respective one of the locking grooves 33 of the limit plate 3.

Figure 7:
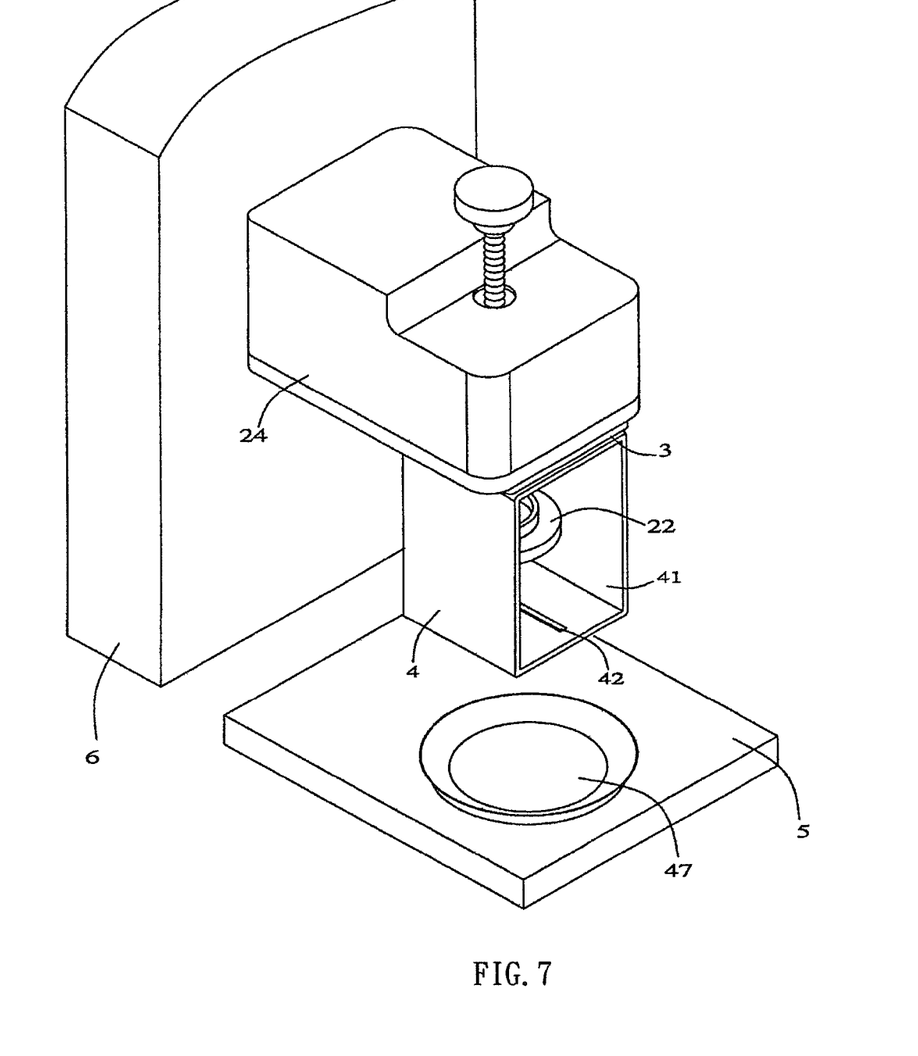
FIG. 7 is a perspective view of an ice shaving machine in accordance with another preferred embodiment of the present invention.

Referring to FIG. 7 with reference to FIGS. 3-6, the drive unit 2 is attached to a wall 6 and is disposed at a horizontal state so that the shaving frame 4 is arranged in a vertical manner. A platform 5 is located under the shaving frame 4, and a placement dish 47 is mounted on the platform 5 and located under the shaving blade 42 of the shaving frame 4. At this time, the receiving chamber 41 of the shaving frame 4 is directed toward a rearward direction of the drive unit 2. When the ice shaving machine is in use, an ice block is placed into the receiving chamber 41 of the shaving frame 4 and located under the rotation disk 22 of the drive unit 2. Then, the driving member 21 of the drive unit 2 is driven by the motor 23 to drive the rotation disk 22 so that the rotation disk 22 of the drive unit 2 is rotated and moved downward to press and rotate the ice block. In such a manner, the ice block is turned by the rotation disk 22 of the drive unit 2 and shaved by the shaving blade 42 of the shaving frame 4 to form a lot of ice chips which are extended through the shaving blade 42 of the shaving frame 4 and are injected toward the placement dish 47. When the ice shaving machine is not used, the shaving frame 4 is rotated relative to the limit plate 3 in the reverse direction to release and detach the locking pieces 462 of the shaving frame 4 from the locking grooves 33 of the limit plate 3 respectively so that the shaving frame 4 is unlocked and can be removed from the limit plate 3. Thus, the shaving frame 4 can be removed from the limit plate 3 so that the shaving frame 4 is cleaned easily and conveniently to facilitate a user cleaning the shaving frame 4 and to achieve a sanitary purpose. In addition, the shaving frame 4 is mounted on and detached from the limit plate 3 easily and quickly to facilitate the user assembling and dismantling the shaving frame 4.

Figure 8:
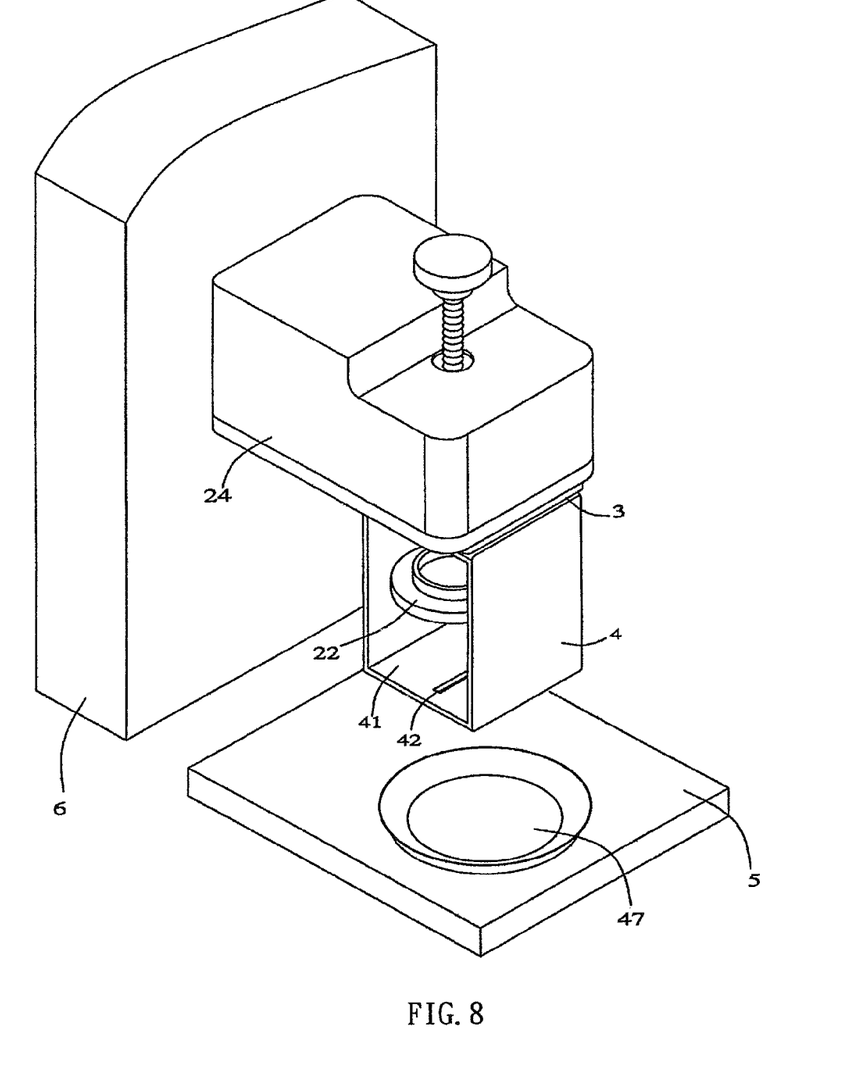
FIG. 8 is another perspective view of the ice shaving machine as shown in FIG. 7.

Referring to FIG. 8 with reference to FIGS. 3-6, the receiving chamber 41 of the shaving frame 4 is directed toward a leftward direction of the drive unit 2 to satisfy the user's practical requirement.

Figure 9:
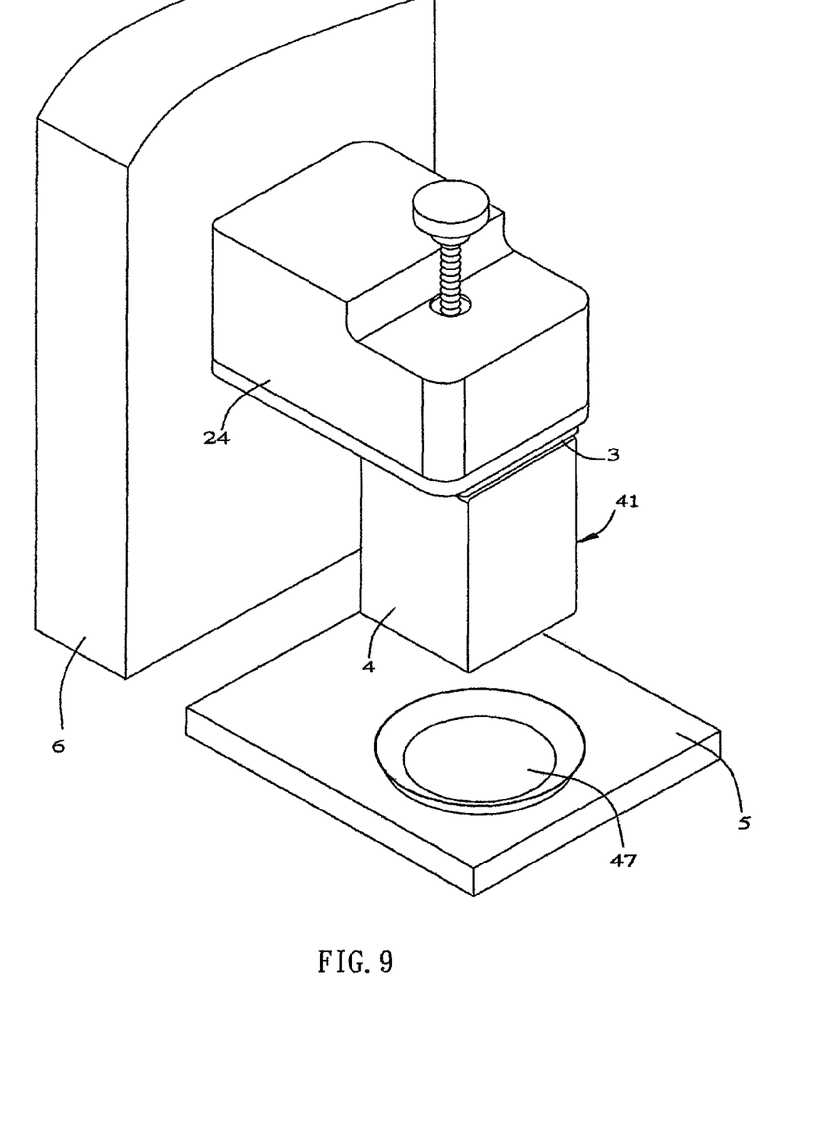
FIG. 9 is another perspective view of the ice shaving machine as shown in FIG. 7.

Referring to FIG. 9 with reference to FIGS. 3-6, the receiving chamber 41 of the shaving frame 4 is directed toward a rightward direction of the drive unit 2 to satisfy the user's practical requirement.

Figure 10:
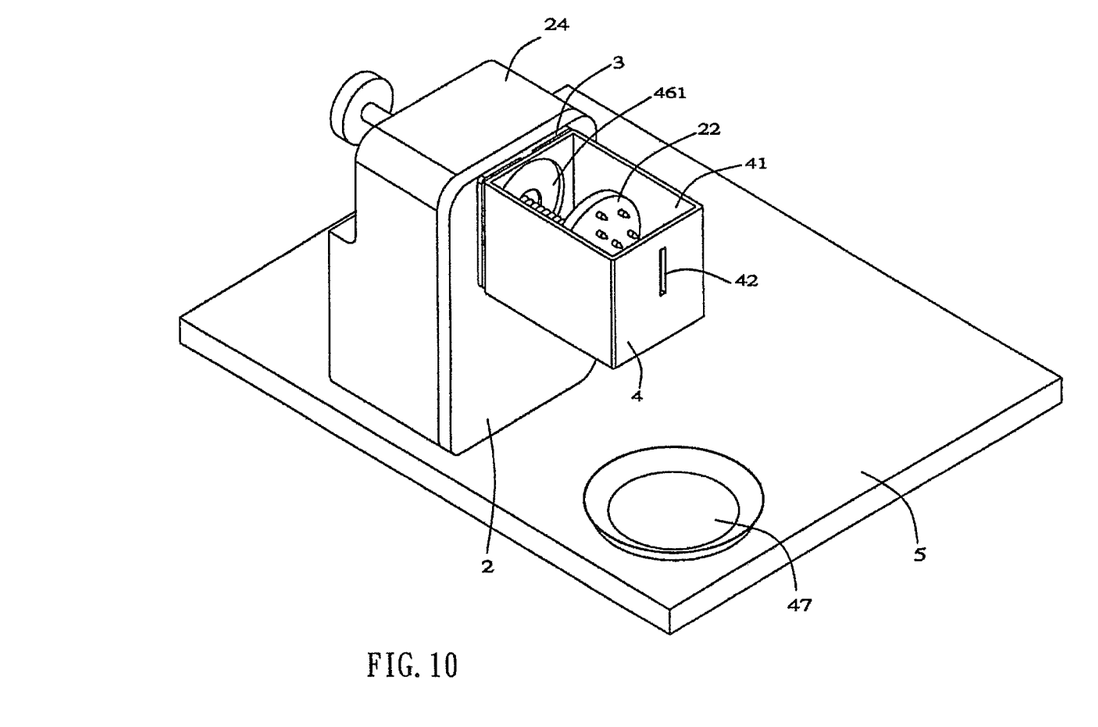
FIG. 10 is a perspective view of an ice shaving machine in accordance with another preferred embodiment of the present invention.

Referring to FIG. 10 with reference to FIGS. 3-6, the drive unit 2 is attached to the platform 5 and is disposed at a vertical state. In such a manner, the shaving frame 4 is arranged in a horizontal manner. The placement dish 47 is mounted on the platform 5 and located under the receiving chamber 41 of the shaving frame 4. When the ice shaving machine is in use, the ice block is turned by the rotation disk 22 of the drive unit 2 and shaved by the shaving blade 42 of the shaving frame 4 to form a lot of ice chips which are extended through the shaving blade 42 of the shaving frame 4 and are injected toward the placement dish 47.

Figure 11:
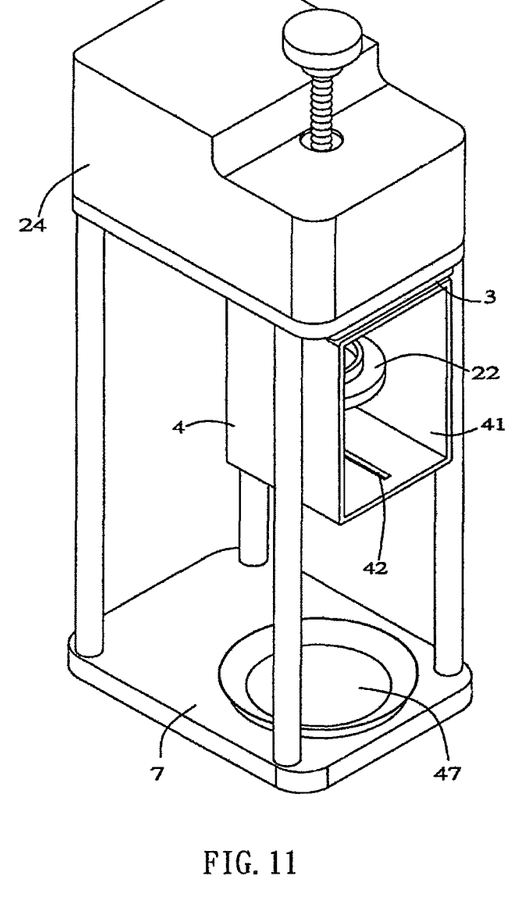
FIG. 11 is a perspective view of an ice shaving machine in accordance with another preferred embodiment of the present invention.

Referring to FIG. 11 with reference to FIGS. 3-6, the drive unit 2 is located above a base 7, and a plurality of support posts (not numbered) are mounted between the drive unit 2 and the base 7. The placement dish 47 is placed on the base 7.

Figure 12:
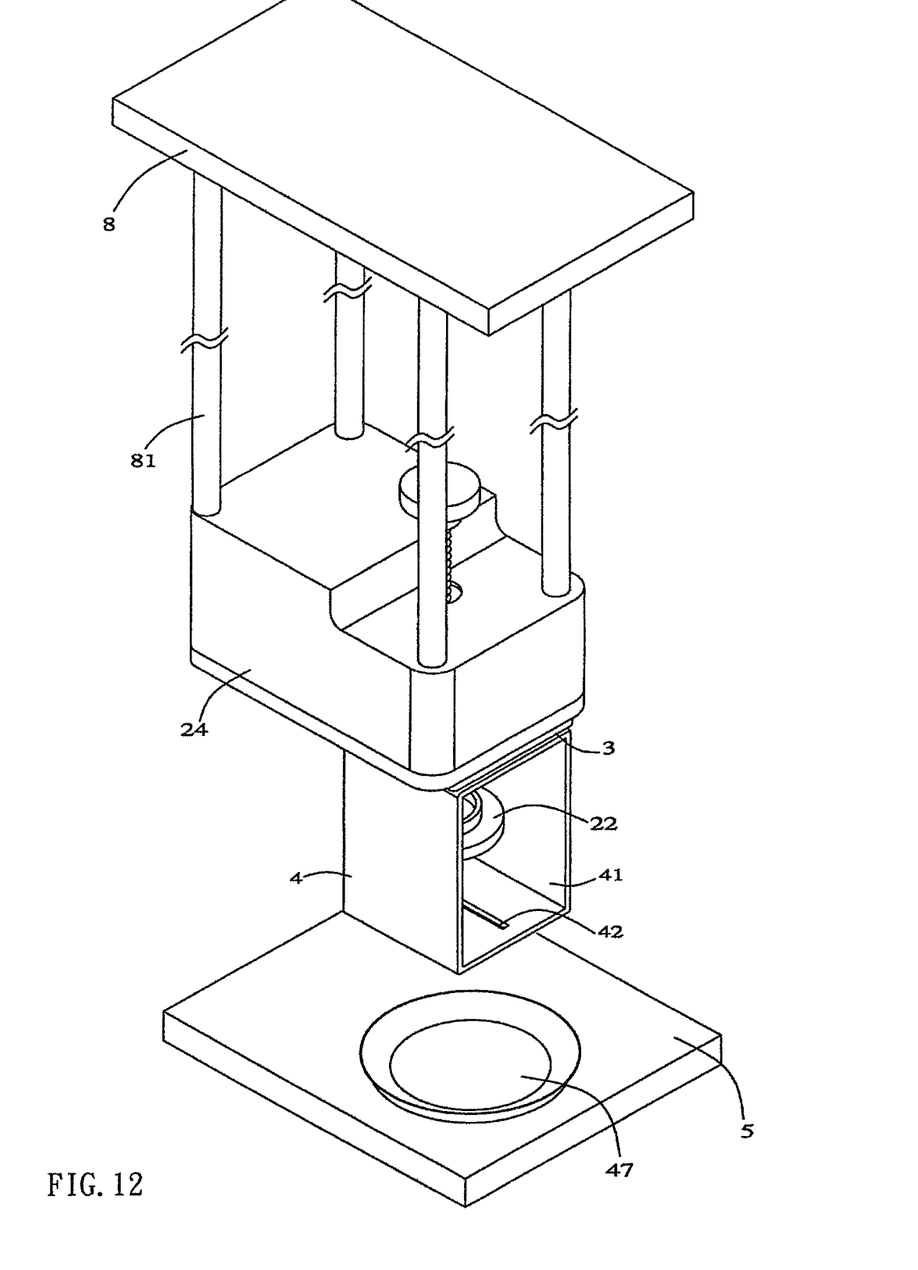
FIG. 12 is a perspective view of an ice shaving machine in accordance with another preferred embodiment of the present invention.

Referring to FIG. 12 with reference to FIGS. 3-6, the drive unit 2 is located under a support rack 8, and a plurality of connecting posts 81 are mounted between the drive unit 2 and the support rack 8. The support rack 8 is secured on a ceiling to attach the drive unit 2 to the ceiling.

Referring to FIGS. 13-16 with reference to FIGS. 3-6, the ice shaving machine further comprises a door 43 pivotally connected with the shaving frame 4 to cover the opening of the receiving chamber 41 of the shaving frame 4, and a handle 431 secured on the door 43 for holding of a user to facilitate the user opening or closing the door 43. The shaving frame 4 is provided with a shaft 44. The shaft 44 is located at a bottom of the receiving chamber 41 of the shaving frame 4. The door 43 has a bottom provided with a pivot slot 432 pivotally mounted on the shaft 44 so that the door 43 is pivotable about the shaft 44. The shaving frame 4 has two opposite sides each provided with a locking recess 45. The door 43 has two opposite sides each provided with a locking hook 433 detachably locked in the locking recess 45 of the shaving frame 4 to releasably lock the door 43 onto the shaving frame 4.

Figure 13:
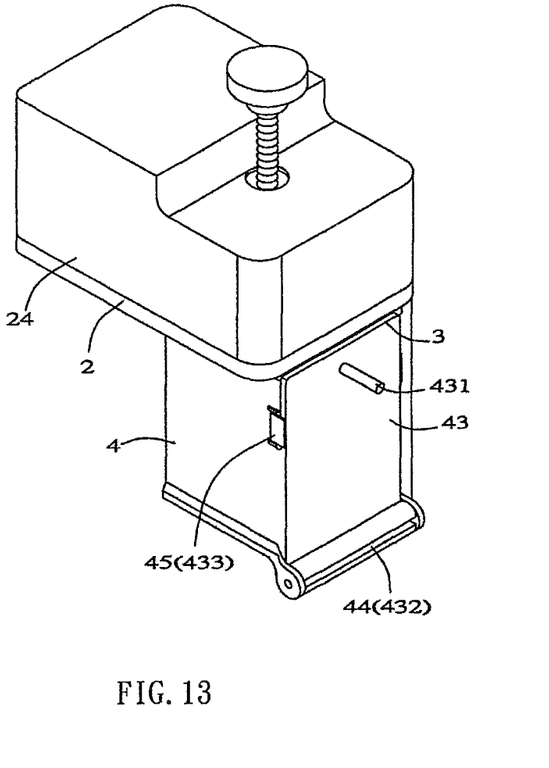
FIG. 13 is a perspective view of an ice shaving machine in accordance with another preferred embodiment of the present invention.
Figure 14:
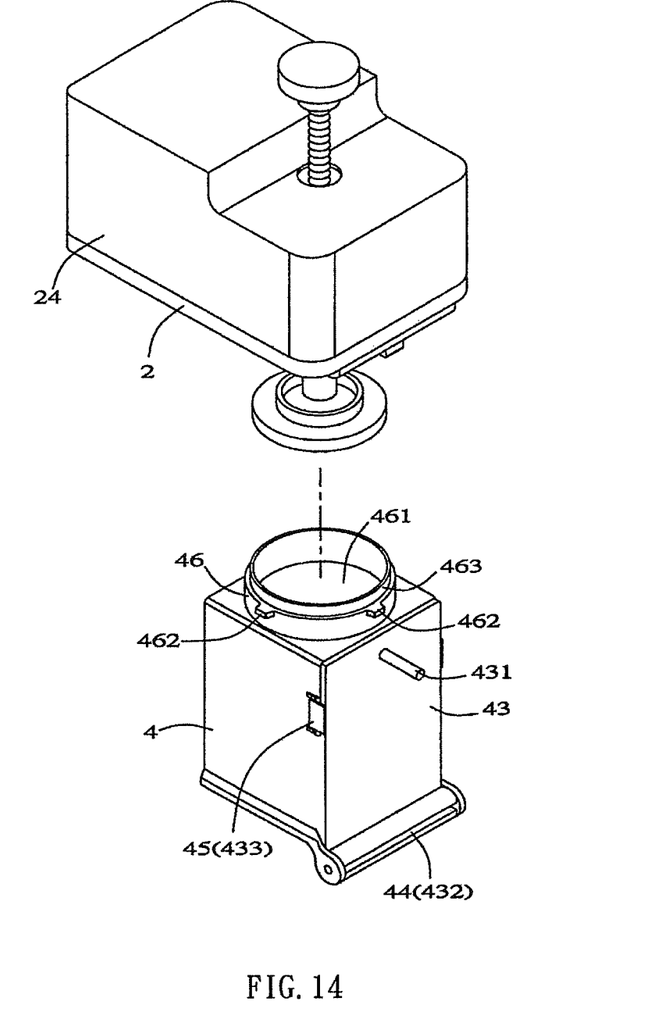
FIG. 14 is an exploded perspective view of the ice shaving machine as shown in FIG. 13.
Figure 15:
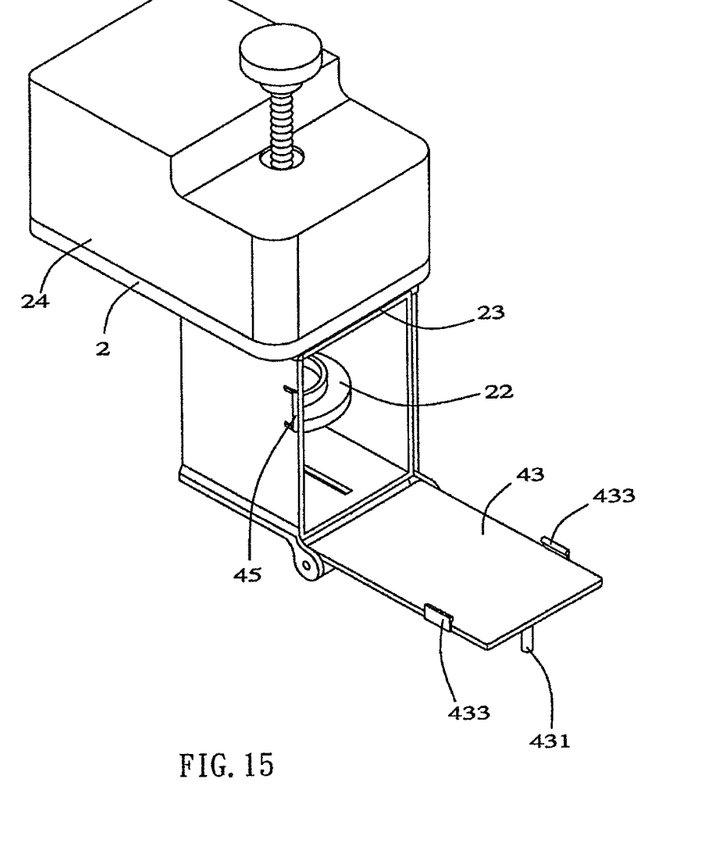
FIG. 15 is a schematic operational view of the ice shaving machine as shown in FIG. 13 in use.
Figure 16:
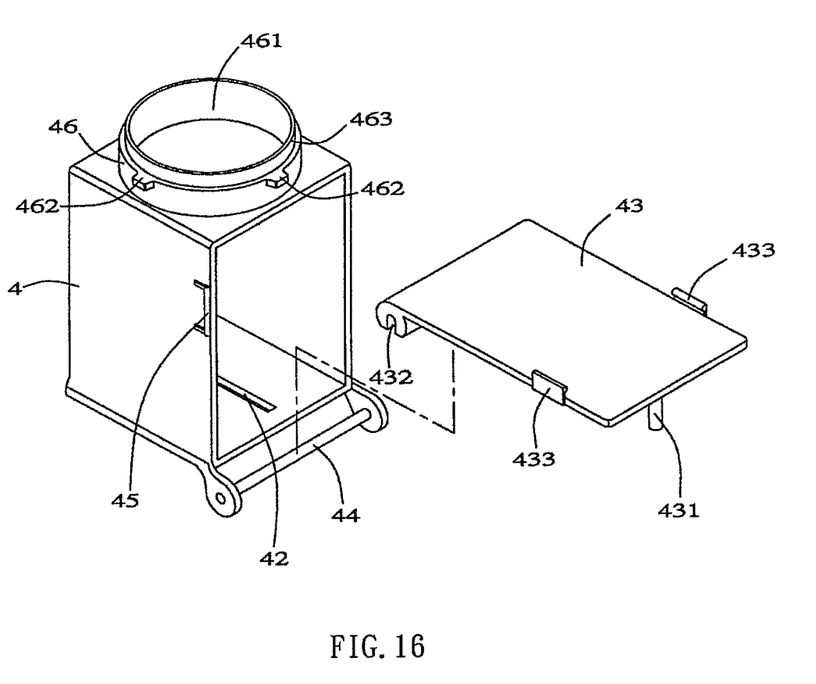
FIG. 16 is a partially exploded perspective view of the ice shaving machine as shown in FIG. 13.

In assembly, the pivot slot 432 of the door 43 has an opening facing the shaft 44. Then, the pivot slot 432 of the door 43 is mounted on the shaft 44. Then, the door 43 is pivoted about the shaft 44 and is moved upward toward the shaving frame 4 so that the locking hook 433 of the door 43 is snapped into and locked in the locking recess 45 of the shaving frame 4 to lock the door 43 onto the shaving frame 4 as shown in FIG. 13. When the ice shaving machine is in use, the door 43 is pulled outward to detach the locking hook 433 of the door 43 from the locking recess 45 of the shaving frame 4 so as to unlock the door 43 from the shaving frame 4 so that the door 43 can be pivoted and moved outward relative to the shaving frame 4 as shown in FIG. 15. In such a manner, the receiving chamber 41 of the shaving frame 4 is opened and exposed to allow entrance of the ice block. After the ice block is placed into the receiving chamber 41 of the shaving frame 4, the door 43 is pivoted and moved toward the shaving frame 4 to close the receiving chamber 41 of the shaving frame 4 again.

Accordingly, the shaving frame 4 can be rotated to remove from the limit plate 3 so that the shaving frame 4 is detached and cleaned easily and conveniently to facilitate a user cleaning the shaving frame 4 and to achieve a sanitary purpose. In addition, the shaving frame 4 is mounted on and detached from the limit plate 3 easily and quickly by rotation of the shaving frame 4 relative to the limit plate 3 so as to facilitate the user assembling and dismantling the shaving frame 4. Further, the ice shaving machine is attached to a wall, ceiling or table so that the ice shaving machine is available for different working sites and positions. Further, the door 43 covers the receiving chamber 41 of the shaving frame 4 to prevent the ice block from being exposed outward.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. An ice shaving machine, comprising:
a drive unit;
a limit plate secured on a bottom of the drive unit; and
a shaving frame detachably combined with the limit plate; wherein:
the drive unit includes a rotation disk;
the limit plate is provided with a through hole to allow passage of the rotation disk of the drive unit;
the limit plate has a bottom provided with a plurality of locking grooves;
the shaving frame has an interior provided with a receiving chamber to receive an ice block;
the receiving chamber of the shaving frame has a side provided with an opening to allow passage of the ice block;
the receiving chamber of the shaving frame has a bottom provided with a slotted shaving blade;
the shaving frame has a top provided with a connecting lug detachably locked onto the limit plate;
the connecting lug of the shaving frame has an interior provided with a passage to allow passage of the rotation disk of the drive unit;
the passage of the connecting lug is connected to the receiving chamber of the shaving frame; and
the connecting lug of the shaving frame has an outer wall provided with a plurality of locking pieces that are detachably locked in the locking grooves of the limit plate.

2. The ice shaving machine of claim 1, wherein the through hole of the limit plate has a circular shape and has a diameter greater than the maximum outer diameter of the rotation disk of the drive unit.

3. The ice shaving machine of claim 1, wherein each of the locking grooves of the limit plate has a first end provided with an entrance and a first end provided with a stop.

4. The ice shaving machine of claim 1, further comprising a door pivotally connected with the shaving frame to cover the opening of the receiving chamber of the shaving frame.

5. The ice shaving machine of claim 4, further comprising a handle secured on the door.

6. The ice shaving machine of claim 4, wherein:
the shaving frame is provided with a shaft;
the shaft is located at a bottom of the receiving chamber of the shaving frame; and
the door has a bottom provided with a pivot slot pivotally mounted on the shaft so that the door is pivotable about the shaft.

7. The ice shaving machine of claim 4, wherein:
the shaving frame has two opposite sides each provided with a locking recess; and
the door has two opposite sides each provided with a locking hook detachably locked in the locking recess of the shaving frame to releasably lock the door onto the shaving frame.

8. The ice shaving machine of claim 1, wherein the connecting lug of the shaving frame has an annular shape and has an outer diameter greater than the diameter of the through hole of the limit plate.

9. The ice shaving machine of claim 1, wherein:
the connecting lug of the shaving frame has a top provided with a neck portion inserted into the through hole of the limit plate;
the neck portion of the connecting lug is located above the locking pieces;
the neck portion of the connecting lug has an annular shape and has an outer diameter slightly smaller than the diameter of the through hole of the limit plate; and
the neck portion of the connecting lug has a height equal to or smaller than the thickness of the limit plate.

10. The ice shaving machine of claim 1, wherein the passage of the connecting lug has a circular shape and has a diameter greater than the maximum outer diameter of the rotation disk of the drive unit.

* * * * *